US005220111A

United States Patent [19]

Bucci et al.

[11] Patent Number: 5,220,111

[45] Date of Patent: Jun. 15, 1993

[54] FIXATION OF HEAVY METALS IN SCRUBBED MUNICIPAL SOLID WASTE INCINERATOR ASH

[75] Inventors: Donald P. Bucci, Mertztown; Francis A. Altemose, II, Long Pond; Nancy C. Easterbrook, Macungie; Edwin N. Givens, Bethlehem; Joseph Klosek, Wescosville, all of Pa.; Kenneth D. Tracy, Randolph, N.J.; Kai P. Wong, Allentown, Pa.

[73] Assignee: Air Products and Chemicals, Inc., Allentown, Pa.

[21] Appl. No.: 757,361

[22] Filed: Sep. 10, 1991

[51] Int. Cl.[5] ........................ C04B 18/08; C04B 18/06; C04B 14/00; C04B 18/30

[52] U.S. Cl. .................................... 580/256; 588/231; 588/233; 588/251; 588/249; 106/710; 106/DIG. 1; 106/287.18

[58] Field of Search ................. 106/710, 707, DIG. 1, 106/287.18; 423/DIG. 20; 588/231, 233, 248, 251, 256

[56] References Cited

U.S. PATENT DOCUMENTS 3,837,872 9/1974 Conner .................................. 106/74
4,209,335 6/1980 Katayama et al. .................. 106/645
4,299,611 11/1981 Penberthy .............................. 65/27
4,342,732 8/1982 Smith ................................. 106/707
4,501,618 2/1985 Gebhard et al. ............ 106/DIG. 1
4,613,374 9/1986 Smith .
4,629,509 12/1986 O'Hara et al. ....................... 106/118
4,737,356 4/1988 O'Hara et al. ....................... 423/659
4,789,532 12/1988 Jons et al. ........................... 106/707
4,971,627 11/1990 Koslowski et al. .......... 106/DIG. 1

*Primary Examiner*—Mark L. Bell
*Assistant Examiner*—Michael A. Marcheschi
*Attorney, Agent, or Firm*—Robert J. Wolff; Thomas G. Ryder; James C. Simmons

[57] ABSTRACT

Fly ash generated from incineration of municipal solid waste (MSW) when placed in landfills under mild acid conditions can leach lead and cadmium. A process for stabilizing heavy metals in this fly ash is presented which involves calcining in the presence of an oxygen containing gas stream at a temperature greater than about 375° C. and substantially less than about 800° C. for times from about 170 seconds up to about 5 hours fly ash which has been subjected to lime scrubbing for acid gas removal. Such treated MSW fly ash will give leachates containing heavy metal concentrations less than the EPA regulatory limit.

16 Claims, 2 Drawing Sheets

FIXATION OF HEAVY METALS IN SCRUBBED MUNICIPAL SOLID WASTE INCINERATOR ASH

FIELD OF THE INVENTION

This invention relates to the treatment of heavy metals-containing fly ash in order to prevent or to reduce substantially the amount of heavy metals, such as lead and cadmium, which may leach from the ash.

BACKGROUND OF INVENTION

Disposal of nonhazardous, municipal solid waste (MSW) is becoming a major crisis across this country as well as the world, since landfill space is becoming more limited and regulations are forcing many landfill sites to close. At the same time costs for disposing of municipal trash are increasing. Incineration of municipal trash is a method which many areas and municipalities employ for dealing with this problem, at least partially, since incineration reduces the volume of the MSW by about 90% and the weight by about 70%, while at the same time eliminating any biologically active materials. Additionally, the energy produced in the incineration can be utilized for generating steam and electricity. This is a great savings in the volume of material to be placed in a landfill and in the weight of material to be transported to a landfill. However, the incineration of MSW tends to concentrate its metals content, particularly heavy metals such as lead and cadmium, in the residue or ash from the combustion. Thus, while incineration reduces the volume of material to be landfilled, at times it tends to produce a residue or ash which contains concentrations of heavy metals in a form, usually a halide, that can leach upon contact with groundwater. When this occurs, such materials become unsuitable for the traditional municipal landfill sites and special landfills and/or secondary ash treatment procedures are required.

The ash from the incineration of MSW or the combustion of other carbon-, heavy metal-, and halogen-containing materials which remains behind in the combustion zone and usually falls to the bottom of the combustion zone (Bottom Ash) makes up over 85% of the residual solids generated by incineration or combustion. Generally, Bottom Ash tends to have lead and cadmium concentrations of less than about 2500 ppm and 15 ppm by weight, respectively. Usually, the metals in Bottom Ash are not in a soluble form, such as a chloride, and, therefore, Bottom Ash is typically innocuous and poses no environmental burden, In fact Bottom Ash can even be used beneficially, such as an aggregate.

On the other hand, however, the very small, solid, particulate matter which is usually carried out of the combustion zone by exiting gas, such as flue gas, makes up the remaining residual solids generated in MSW incinerators or other combustion zones. This entrained solid particulate matter is generally termed fly ash. It is enriched in lead and cadmium halides, particularly chlorides, and upon separation from the gas in which it is entrained can represent a disposal problem since, upon exposure to ground water (such as in a landfill) can leach substantial quantities of lead and cadmium. Typical Fly Ash from an MSW incinerator can have lead and cadmium concentrations of greater than about 3500 ppm and 200 ppm by weight, respectively. Thus, while incineration reduces the total volume and weight of material for disposal, it produces a material which can present a disposal problem.

Several methods have been suggested to stabilize these residual solids to prevent the leaching of heavy metals, such as lead and cadmium, into groundwater. U.S. Pat. No. 4,629,509 teaches the addition of calcium sulfide to the fly ash produced from incineration of MSW in order to form highly insoluble cadmium and lead sulfides, thereby immobilizing the lead and cadmium and preventing their leaching. This patent also suggests effecting heavy metal stabilization through addition of a mixture of lime and an aqueous solution of a soluble sulfide such as sodium sulfide.

It has also been suggested, in U.S. Pat. No. 4,737,356, that the addition of a water soluble phosphate to ash containing free lime immobilizes the lead to leaching in a pH range of from approximately 5 to 12. Soluble phosphate addition in the form of phosphoric acid in the proportion of from 1 to 8% by weight of the ash is taught to reduce the leachable lead to below the EPA regulatory limits over a broader pH range than without this treatment.

Another method suggested for stabilizing waste materials, ash and related residues is through addition of soluble silicates and silicating setting agents to the waste material in order to produce insoluble metal silicates. This technique is described, for example, in U.S. Pat. No. 3,837,872.

It has further been suggested (U.S. Pat. No. 4,299,611) that ash may be vitrified in a glass furnace at a temperature in the range of about 2500° F. The resulting glass material, which has a significantly reduced surface area, is said to resist extraction of the heavy metals when exposed to groundwater or to EPA tests designed to simulate groundwater extraction conditions.

BRIEF SUMMARY OF INVENTION

This invention is directed to a process for the stabilization of a heavy metals-containing fly ash obtained by subjecting flue gas to particulate separation, particularly flue gas from the combustion of a carbon-, heavy metal-, and halogen-containing material, which has been subjected to lime scrubbing for purposes of acid gas removal employing lime in the range from about 1 to about 4 times the amount stoichiometrically required to react with the capturable acid gas components in the flue gas. This fly ash is heated to a temperature from about 375° C. to less than about 800° C., preferably about 375° C. to about 650° C. and more preferably about 450° C. to about 600° C. and maintained at this temperature for at least about 170 seconds and less than about five hours, preferably about 170 seconds to about 3 hours and more preferably about 200 seconds to about 1 hour while in contact with an oxygen-containing gas.

One particular embodiment of the present invention is to use the furnace of a MSW incineration plant as the source of heat required by the present invention and to use ambient air as the oxygen-containing gas required by the invention. FIG. 1 illustrates this embodiment.

A second embodiment of the present invention is to heat ambient air as the oxygen-containing gas to a temperature from about 375° C. to about 800° C. followed by contacting the mixture of fly ash and the calcium-containing material with the heated air for a period of time from about 170 seconds to about five hours wherein said contacting is performed while the mixture is contained within a fluidized bed. FIG. 2 illustrates this embodiment.

DETAILED DESCRIPTION OF INVENTION

Figure 1:
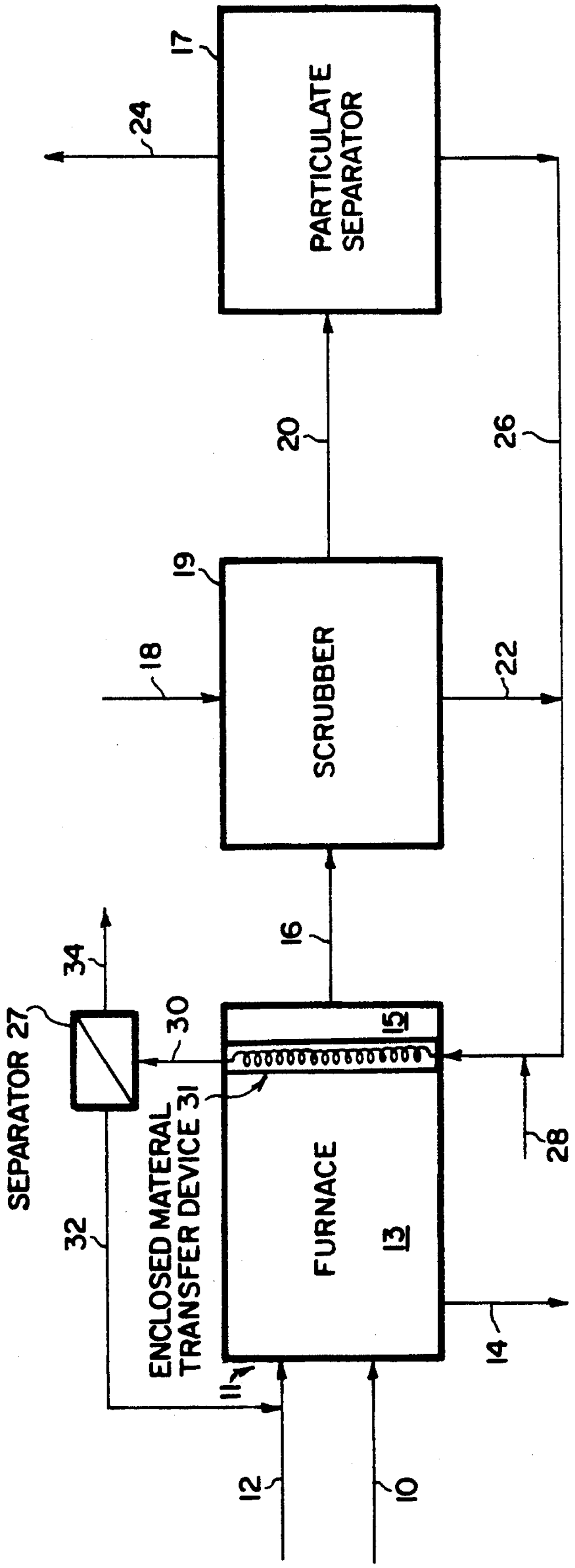
FIG. 1 is a flow diagram of one embodiment of the present invention.

In this specification the term fly ash will be used to describe the finely divided particualte material that can be separated from a gaseous stream in which it is entrained and which has been subjected to calcium scrubbing. Illustrative of such particulate materials are those obtained from the flue gas from various combustion techniques. Thus, for example, the combustion or incineration of a carbon-, heavy metal- and halogen-containing material, such as refuse material, typically municipal solid waste, produces an ash product and an exit gas stream in which are entrained solid particles. Since halogens, and particularly chlorine, in the form of various halogenated or chlorinated polymers are present in the trash being fed to the incinerator, hydrogen halides, particularly hyddrogen chloride, are major products from the incineration of these materials. A sizable amount of the hydrogen halides, especially chlorides, that are formed are swept in the gaseous stream from the incineration zone along with various volatile metal halides, particularly chlorides, of lead and cadmium. It is by this mechanism that a portion of the heavy metals present in the refuse escapes from the incineration section of the incinerator and becomes incorporated into the fly ash product.

The effluent gas stream, along with the acid gases, heavy metal halides (including chlorides) and particulate matter, is passed into intimate contact with an aqueous calcium-containing material, such as a slurry, suspension or emulsion of a chemical agent such as, for example, slaked lime, limestone or other calcium-containing material capable of forming calcium oxide under the conditions of elevated temperature employed in this invention, which reacts with the acid gases to form new chemical compounds. These reactions result in removal of hydrogen chloride and sulfur dioxide from the gaseous exit stream. The reaction of the lime or slaked lime traps the hydrogen chloride as calcium chloride and sulfur dioxide as calcium sulfite, which is subsequently oxidized to calcium sulfate.

One typical acid gas removal system operates by spraying a slurry of slaked lime into the path of the exiting process gas stream. The intimate contact of the acid gases with the droplets of slaked lime slurry results in the acid gases dissolving in the liquid film and reacting with the calcium hydroxide present in the film. The reactions of both hydrogen chloride and sulfur dioxide with the slurry results in formation of calcium chloride and calcium sulfite, which readily oxidizes to calcium sulfate. As the slurry water is removed through drying in the hot gaseous stream solid particles form. A portion of these solids become entrained within the flow of the flue gas stream and thus makes up a portion of the fly ash from the process. The remaining portion of the fly ash mixture is comprised of unreacted scrubber agent and scrubber product that fails to become entrained in the gas stream and is separated by gravity and may be combined with the suspended fly ash material that is collected in the particulate collection section.

In another typical acid gas removal system, the exiting process gas stream is passed through an aqueous slurry of limestone. The intimate contact of the acid gases with the slurry of limestone also results in the acid gases dissolving in the slurry and reacting with the calcium oxide present in the film. The reactions of both hydrogen chloride and sulfur dioxide with the slurry results in formation of calcium chloride and calcium sulfite, which readily oxidizes to calcium sulfate.

In still another type of system, more traditionally employed in power generating systems, a dry calcium-containing material, such as tricalcium oxide, can be introduced into a stream of flue gas by aspiration. This type of system is quite effective for the removal of acid gas components.

In order to promote the removal of higher concentrations of the acid gases, especially sulfur dioxide, a stoichiometric excess of the calcium compound, e.g. slaked lime, limestone, thermal precursor of calcium oxide, etc., required to react with all acid gas components capturable by the contacting can be used. Typically, for municipal waste incinerators, from about 1 to about 4 times the stoichiometric amount of lime is used and generally greater than about 1. Stoichiometric ratios of greater than about 1.2:1 and at times greater than about 1.5:1 can be used. Normally, the stoichiometric amount of lime used is not more than about 3.5 times, typically not more than about 2.8 times the amount stoichiometrically required to react with such acid gas components. This translates to a usage of from about 10 to about 40 pounds of lime per ton of refuse with the lower limits corresponding to the stoichiometric quantities of 1.2 and 1.5 being about 12 pounds and about 15 pounds, respectively per ton of refuse. Usually, no more than about 35 pounds of lime per pound of refuse are used and preferably no more than about 28 pounds of lime per pound of refuse are employed.

To express this in another manner, the amount of lime employed in the scrubbing operation is in the range from about 0.02 to about 0.4 pounds of lime per thousand standard cubic foot (MSCF) of flue gas and preferably at least about 0.03, more preferably at least about 0.05, pounds of lime per MSCF. Usually, no more than about 0.3 pounds of lime per MSCF are used and preferably no more than about 0.2 pounds of lime per MSCF are employed.

In many instances an excess of strong base, due to the presence of unreacted lime and slaked lime, is typically carried through with the flue gas and is collected in the particulate collection device.

The entrained acid gas products from the scrubber section, solid particles from the incineration section, and particles of unreacted scrubber reagent, namely the excess of slaked lime reagent, are collected in a particulate collection system to prevent their escape into the ambient air. Several technologies have been effectively employed to collect particulate matter, of which many have found use in waste incinerator applications. These include cyclones, electrostatic precipitators, filtering systems, e.g. bag houses, and centrifuges. The method of coupling of these systems with incinerators may vary depending on the application but all can effectively remove both the ash coming from the incineration section as well as the solids generated in the gas scrubbing section.

Both the solids that are entrained within a flow of the flue gas stream and the mixture of unreacted scrubber agent and scrubber product that become entrained in the gas stream will be enriched in heavy metals that deposit when the effluent gas from the incinerator contacts the scrubbing agent.

When the flue gas has been subjected to scrubbing for acid gas removal, the calcium-containing material contained with the fly ash can be calcium oxide, calcium carbonate, calcium hydroxide, calcium sulfite, calcium sulfate, calcium chloride or any of the other calcium compounds formed during the scrubbing operation. The intimate contact of these materials with the heavy metal materials is important so as to promote the reaction of the soluble and volatile heavy metal component with the active agent.

In accordance with this invention the scrubbed fly ash which includes calcium-containing material is placed within a heated zone in the presence of an oxygen containing gas at a temperature which is greater than about 375° C. but less than a temperature that causes significant vaporization of lead chloride to occur. The latter temperature will be less than the temperature at which lead chloride will boil, namely 950° C., and preferably be at a temperature at which the vapor pressure of lead chloride is quite low. The time the ash is kept at temperature is important, being at least about 170 seconds up to about five hours. To those experienced in the art, additional testing and improved control characteristics can result in reduced stabilization times. When the time is from about 3 minutes to about thirty minutes, the temperature is from about 375° C. to about 550° C.

The presence of oxygen during the thermal treatment is essential for stabilization to occur. We have found that heating in the absence of sufficient oxygen fails to promote the transformations necessary to bind the heavy metals in such a manner to prevent their dissolution into groundwater. The treatment can be conducted in the presence of an oxygen-containing gas which can be air, air enriched with oxygen, or a process gas stream containing sufficient oxygen. It is also believed that higher oxygen partial pressures also promotes faster stabilization at a particular temperature. It has also been found advantageous to effect the thermal treatment of this invention by flowing, preferably under turbulent conditions, the oxygen-containing gas stream over the ash to be treated. It is believed that this movement of the gas results in a better and more intimate contacting of the ash and the oxygen-containing gas, thus resulting in a more efficient thermal treatment and permitting, for example, a lower temperature than would be required under more quiescent conditions. In addition to decreased temperatures, more turbulent conditions may with increased testing and improved control characteristics result in decreased treatment times as well.

The process of this invention can be conducted in a batch or continuous manner.

A common problem that occurs in handling solids of the small size typical of fly ash materials is their propensity to form dust and become airborne within the surrounding air. Often water or dust inhibitors have to be added to keep down the dust that forms when handling these materials, especially in transferring these solids between containers or into vehicles for transport. A unique benefit of the thermal treatment process as disclosed herein is that the average particle size of the thermally treated material increases making the material considerably less dusty.

EXAMPLES

In Examples 1 and 2, the fly ash samples (whether treated in accordance with this invention or not) were subject to an acid leaching procedure comparable to the toxicity characteristic leaching procedure (TCLP) as defined in 40 CFR 261, Appendix II, which appeared in the Federal Register 55 (61), 11863ff, Mar. 29, 1990. In accordance with the procedure used in the following examples a 50 gram sample of ash material was mixed with 1000 ml of 0.1N acetic acid (2 milliequivalents of acid per gram of ash) and placed into a polyethylene extractor bottle and the screw lid securely fastened. The bottle was placed into a rotary agitation device and rotated at a rate of 30 rpm for 18 hours at ambient temperature. The resultant mixture was filtered through a fiber filter having an effective pore size of 0.6–0.8 micrometers to remove undissolved solids. The concentration of soluble lead in milligrams per liter was determined and the pH of the filtrate was measured in most cases. If the concentration of soluble lead equals or exceeds 5 mg/l, the ash from which it was obtained is designated by the Environmental Protection Agency (EPA) as a "Hazardous Waste".

EXAMPLE 1

In this Example the fly ash employed was obtained from a waste-to-energy municipal waste incinerator plant that was burning municipal trash. This incinerator plant employed an acid gas removal system in which slurried lime was sprayed into intimate contact with the effluent gas from the incinerator. This plant was designed so as to employ in the scrubbing operation twenty pounds of lime per ton of refuse burned, which equates to about 0.06 pounds of lime per thousand standard cubic foot of flue gas treated. Stated in another manner, this plant was designed to operate employing a stoichiometric ratio of calcium to acid gas components of 2:1, with sufficient heat present in the gas and solid from the incinerator to completely evaporate the excess water in the lime slurry resulting in a dry solid which was then collected in a baghouse employed to remove particulate matter from the flue gas. Thus, the fly ash used herein contained scrubber solids.

Multiple samples of the fly ash mixture described above were obtained and all but one such sample were placed in separate porcelain crucibles and heated in the presence of air under quiescent conditions in a muffle furnace. The temperature in the furnace for each of the runs was recorded as well as the duration of the thermal treatment. These temperatures and times are set forth in Table I, below. All of the samples (including the sample which was not heated) were then subjected to the TCLP-type acid leaching test described above. Lead leaching results for all samples were determined. Additionally, the total amount of lead in several of these samples was determined. These data are shown in Table I, below.

TABLE I

| Run No. | Treatment Temp, °C. | Treatment Time, Hrs | Final pH | Lead Conc mg/L | Cd Conc mg/L | Lead Conc wt % |
|---|---|---|---|---|---|---|
| 1 | none | none | 12.4 | 55.0 | | 0.29 |
| 2 | 625 | 4 | | <0.2 | | |
| 3 | 550 | 4 | 10.1 | <0.2 | | |
| 4 | 550 | 1 | | <0.1 | | 0.29 |
| 5 | 550 | 0.5 | | <0.1 | | 0.31 |
| 6 | 550 | 0.25 | | <0.1 | | 0.30 |

TABLE I-continued

| Run No. | Treatment Temp, °C. | Treatment Time, Hrs | Final pH | Lead Conc mg/L | Cd Conc mg/L | Lead Conc wt % |
|---|---|---|---|---|---|---|
| 7 | 550 | 0.083 | 11.9 | 3.4 | | |
| 8 | 550 | 0.05 | 12.1 | 12.6 | | |
| 9 | 475 | 4 | 10.6 | <0.2 | | |
| 10 | 475 | 1 | | 3.0 | <0.05 | |
| 11 | 410 | 4 | 12.1 | 8.1 | | |

The above data show that thermal treatment in accordance with this invention at temperatures of 475° C. or greater and for periods of time as low as five minutes produce stabilized fly ash with the amount of leachable lead being reduced to less than the EPA regulatory level of 5 mg/L. Analysis of the total lead concentrations of several of the samples passing the acid leaching test (Run Nos. 4, 5 and 6), when compared to the lead concentration of the untreated sample (Run No. 1), show that no detectable level of lead was lost or removed from the sample due to the thermal treatment of the present invention.

EXAMPLE 2

A 75 gram sample of the fly ash employed in Example 1 was placed in a porcelain crucible and covered with a lid in order to prevent contact of the fly ash with air while being heated. The crucible was then heated at 475° C. for one hour. The resulting treated material was then subjected to the acid leaching test and found to contain 22.8 mg/L lead in the leaching solution with a pH of 12.1. This result compared to the results obtained with Run No. 10 in Example 1, which was treated in the same manner as this Example except in the presence of air, shows the need for conducting the thermal treatment of this invention in the presence of oxygen, e.g. air.

EXAMPLE 3

Particle size measurements were performed on two samples using a Tyler Rotap Sieve Shaker and U.S. Standard Sieves by placing solids on the screen having the largest opening and shaking the assembly of screens which are comprised of the set as shown in Table II for a period of 15 minutes. The weight per cent recovered on each screen was then determined for each sample. The two samples which were subjected to this test were the untreated fly ash described in Example 1 (Run No. 1) and Run No. 2 of Example 1, which had been treated in accordance with the process of this invention.

TABLE II

| PARTICLE SIZE | | Material of Run No. 1 | Material of Run No. 2 (Heated at 625° C. for 4 hours) |
|---|---|---|---|
| U.S. Std. Sieve | Micrometers | WT % | WT % |
| 50 | >297 | 0.3 | 0.3 |
| 100 | <297 to >149 | 3.3 | 10.0 |
| 200 | <149 to >74 | 9.8 | 30.6 |
| 325 | <74 to >44 | 18.4 | 28.3 |
| Pan | <44 | 69.2 | 30.8 |
| TOTAL | | 100.0 | 100.0 |

The particle size distributions as shown in Table II above indicate that the material of Run No. 2 was larger than the untreated fly ash. This demonstrates that thermal treatment in accordance with the process of this invention increases the particle sizes which thereby makes the thermally treated material of this invention less dusty than the untreated material. Lower dustiness results in a reduction in the amount of airborne contaminants which form when transferring and loading these materials for transport or disposal.

EXAMPLE 4

This example illustrates the loss of lead that occurs during vitrification of ash at high temperature. About 50 grams of the untreated fly ash of Example 1 was placed in an electric arc furnace in a 300 ml open alumina crucible into which a thermocouple was placed to monitor the temperature. The ash was heated to 1300° C., which took about one hour. Once fusion began at 1300° C. it was complete within less than one minute. After cooling the material was subjected to the acid leaching test. The leachable lead from the vitrified fly ash was less than 0.1 mg/L. The total amount of lead in the vitrified ash was 0.016 wt % compared to 0.29 wt % in the untreated ash. Much of the lead was, therefore, lost during vitrification. In contrast, the fly ash of Example 1 when heated at 550° C. showed no detectable loss of lead as shown in Run Nos. 4, 5 and 6 in Table I.

EXAMPLE 5

In this Example multiple samples of a fly ash obtained by scrubbing a flue gas from a municipal solid waste incinerator with a limestone slurry which was sprayed into intimate contact with the flue gas. This MSW incineration facility was designed to treat a flue gas containing about 650 ppm HCl and about 325 ppm $SO_x$ and to employ in the scrubbing operation sixteen pounds of lime per ton of refuse burned, which equates to about 0.05 pounds of lime per thousand standard cubic foot of flue gas treated. Stated in another manner, this plant was designed to operate employing a stoichiometric ratio of calcium to acid gas components of about 1.5:1, with sufficient heat present in the gas and solid from the incinerator to completely evaporate the excess water in the lime slurry resulting in a dry solid which was then collected in a baghouse employed to remove particulate matter from the flue gas. Thus, the fly ash used herein contained scrubber solids.

In all runs except Run No. 1, the samples of fly ash were subjected to thermal treatment in accordance with this invention by placing the individual sample in an alumina pan in a furnace and passing a stream of air over the sample at a rate of 100 cc per minute. Each of the samples was thermally treated at the particular temperature set forth in Table III, below. The fly ash samples reached the stated temperatures within about three minutes after having been placed in the furnace and were maintained at the stated temperatures for the periods of time indicated in Table III. After the thermally treated samples were cooled, all of the samples were each subjected to a leaching test wherein one part by weight of the fly ash sample was mixed with 20 parts by weight of 0.1N acetic acid (2 milliequivalents of acid per gram of fly ash) and placed into a polyethylene extractor bottle and the screw lid securely fastened. The bottle was placed into a rotary agitation device and rotated at a rate of 30 rpm for 18 hours at ambient temperature. The resultant mixture was filtered through a fiber filter having an effective pore size of 0.6–0.8 micrometers to remove undissolved solids. The pH of the filtrate was measured and the concentration of soluble lead in milligrams per liter determined. A concentration of soluble lead less than 5 mg/l, is required in order to avoid being designated by the Environmental Protection Agency (EPA) as a "Hazardous Waste".

The results of such testing for each of the runs of this example are set forth in Table III.

TABLE III

| RUN NO. | TEMP. °C. | TIME SEC. | FINAL Test pH | Lead Leach (ppm) |
|---|---|---|---|---|
| 1 | 0 | 0 | 12.11 | 37.40 |
| 2 | 700 | 200 | 10.8 | 0.10 |
| 3 | 700 | 200 | 10.82 | 0.11 |
| 4 | 550 | 170 | 10.93 | 0.12 |
| 5 | 550 | 210 | 11.03 | 0.18 |
| 6 | 550 | 240 | 10.97 | 0.18 |
| 7 | 550 | 250 | 10.83 | 0.07 |
| 8 | 550 | 250 | 10.93 | 0.12 |
| 9 | 550 | 460 | 10.91 | 0.80 |
| 10 | 550 | 510 | 10.97 | 0.70 |
| 11 | 550 | 690 | 11.06 | 0.09 |
| 12 | 550 | 1800 | 11.09 | 0.87 |
| 13 | 450 | 200 | 9.15 | 0.05 |
| 14 | 450 | 200 | 9.45 | 0.07 |
| 15 | 450 | 600 | 9.46 | 0.05 |
| 16 | 450 | 600 | 9.38 | 0.18 |
| 17 | 450 | 600 | 9.38 | 0.08 |
| 18 | 450 | 600 | 9.44 | 0.05 |
| 19 | 450 | 1000 | 9.66 | 0.05 |
| 20 | 450 | 1000 | 9.29 | 0.05 |
| 21 | 450 | 1500 | 9.96 | 0.05 |
| 22 | 450 | 1500 | 9.57 | 0.05 |
| 23 | 450 | 1800 | 9.66 | 0.05 |
| 24 | 450 | 1820 | 9.70 | 0.05 |
| 25 | 412 | 200 | 9.86 | 0.17 |
| 26 | 412 | 200 | 9.94 | 0.24 |
| 27 | 412 | 600 | 9.58 | 0.12 |
| 28 | 412 | 600 | 9.69 | 0.05 |
| 29 | 412 | 1000 | 8.94 | 0.05 |
| 30 | 412 | 1000 | 8.71 | 0.06 |
| 31 | 412 | 1500 | 8.55 | 0.10 |
| 32 | 412 | 1500 | 8.59 | 0.06 |
| 33 | 412 | 2000 | 8.22 | 0.24 |
| 34 | 412 | 2000 | 8.41 | 0.11 |
| 35 | 375 | 200 | 11.40 | 9.40 |
| 36 | 375 | 200 | 11.29 | 7.10 |
| 37 | 375 | 600 | 9.48 | 0.20 |
| 38 | 375 | 600 | 10.64 | 0.93 |
| 39 | 375 | 1000 | 8.54 | 0.17 |
| 40 | 375 | 1000 | 9.50 | 0.20 |
| 41 | 375 | 1500 | 9.46 | 0.19 |
| 42 | 375 | 1500 | 9.36 | 0.12 |
| 43 | 375 | 2000 | 9.03 | 0.11 |
| 44 | 375 | 2000 | 8.86 | 0.13 |
| 45 | 375 | 2000 | 9.18 | 0.10 |
| 46 | 275 | 200 | 11.68 | 33.30 |
| 49 | 275 | 600 | 11.57 | 34.70 |
| 52 | 275 | 1000 | 11.46 | 33.60 |
| 53 | 275 | 1500 | 11.78 | 33.70 |
| 56 | 275 | 2000 | 11.35 | 35.70 |

From the data shown in Table III, above, it can be seen that when the process of this invention is practiced employing a flowing stream of oxygen-containing gas, the temperature and period of time required for proper treatment is substantially less than when quiescent conditions are employed. Thus, Run No. 4 of this example demonstrates the operability of this invention at a time of only 170 seconds as compared, for example, to the approximately 300 seconds, or 0.083 hr., shown in Run No. 7 of Example 1. Further, it will be noted that temperatures as low as 375° C. employed for as short a period of time as five minutes provided satisfactory results when a the fly ash to be treated was heated in a flowing stream of oxygen-containing gas (See Run No. 37 of this example) compared to the results obtained under quiescent conditions (Runs Nos. 9 & 10 of Example 1).

EXAMPLE 6

In this example baghouse samples of fly ash obtained from two different trains (A and B) utilized for the separate incineration of municipal solid waste and treatment of the flue gas obtained from such combustion. In each of the trains, the separate streams of the flue gas containing acid gas components and particulate solids were separately subjected to spray dry adsorption with slaked lime for acid gas removal. The slaked lime was employed so as to provide about sixteen pounds of lime per ton of garbage burned. This is the equivalent of about 0.05 pounds of lime per MSCF of flue gas. This installation was also designed to employ calcium in a stoichiometric ratio to acid gas components of about 1.5:1. Sufficient heat was provided so as to evaporate the water in the slaked lime and provide dry solids. Fly ash was collected from trans A and B and separated into separate samples. One such sample from each train was placed in a crucible in a muffle furnace and treated in accordance with the process of this invention and then subjected to acid leaching as employed in Examples 1 and 2, while another sample from each train was subjected to the same acid leaching without having been treated in accordance with this invention. The conditions employed in the treatment according to this invention together with the results of the acid leaching tests are set forth below in Table IV.

TABLE IV

| | Final pH | Lead Conc mg/L | Cadmium Conc mg/L |
|---|---|---|---|
| Train A Samples | | | |
| Untreated | 12 | 50.0 | <0.02 |
| 550° C.; 0.5 hr. | 10 | 0.1 | <0.02 |
| Train B Samples | | | |
| Untreated | 7 | 2.0 | 3.4 |
| 550° C.; 0.5 hr. | 10 | 0.1 | <0.02 |

From the above data it can be seen that the untreated fly ash from Train A had a very high level of lead leaching exceeding the EPA limit of 5 mg/L by an order of magnitude, but that the fly ash of Train A when treated in accordance with this invention had a reduced pH and a reduced level of lead leaching, well below the EPA limit. Conversely, it will be noted that the untreated fly ash from Train B had a relatively low pH and an unacceptable high level of cadmium leaching, which exceed to EPA limit of 1 ppm. When this fly ash was subjected to treatment in accordance with this inveniton, the final pH of the leachate increased significantly and the level of the cadmium leached dropped to a level well within the EPA limit.

One particular embodiment of the present invention is to use the furnace of a MSW incineration plant as the source of heat required by the present invention and to use ambient air as the oxygen-containing gas required by the invention. FIG. 1 illustrates this embodiment. Referring now to FIG. 1, a MSW feed stream containing carbon-, heavy metal-, and halogen-containing materials (stream 10) and an ambient air stream (stream 12) are fed to a furnace 11 having a combustion zone 13 and a heat recovery zone 15, a portion of which heat recovery zone 15 is at a temperature from about 375° C. to about 800° C. In the furnace's combustion zone 13, the MSW feed stream is burned to produce combustion products in the solid state and combustion products in the gaseous state. A portion of the solid state combustion products becomes entrained in the gaseous state combustion products and this mixture is removed from the furnace 11 as an acid gas-containing flue gas in stream 16. The remaining portion of the solid state combustion products that does not become entrained in the gaseous state combustion products is removed from the furnace 11 as a bottom ash product in stream 14. The acid gas-containing flue gas is then fed to a scrubber 19 where it is scrubbed with a calcium-containing compound in stream 18 to produce scrubbed products in the solid state and scrubbed products in the gaseous state. A portion of the solid state scrubbed products becomes entrained in the gaseous state scrubbed products and this mixture is removed from the scrubber in line 20. The remaining portion of the solid state scrubber products is removed from the scrubber in line 22 as a heavy metals-containing fly ash. Line 20 is subsequently fed to a particulate separator 17 where it is separated into the gaseous state scrubbed products and the portion of the solid state scrubbed products formerly entrained therein. The gaseous state scrubbed products are vented as a stack gas in stream 24 while the formerly entrained solid state scrubbed products are removed in stream 26 as a heavy metals-containing fly ash. The two streams of heavy metals-containing fly ash (i.e. streams 22 and 26) are then combined and subsequently mixed with ambient air (stream 28) prior to being placed in the portion of the furnace's heat recovery zone 15 which is at a temperature from about 375° C. to about 800° C. for a period of time from about 170 seconds to about five hours. The mixture of treated fly ash and air is then removed from the furnace 11 in stream 30 and fed to a separator 27 to separate the air from the treated fly ash. The separated air is recycled back to the furnace 11 in stream 32 while the treated fly ash exits the separator 27 in stream 34. As shown in FIG. 1, the mixture comprising the fly ash enters and exits the furnace 11 by means of an enclosed material transfer device 31. An example of such a device would be a screw conveyor.

Figure 2:
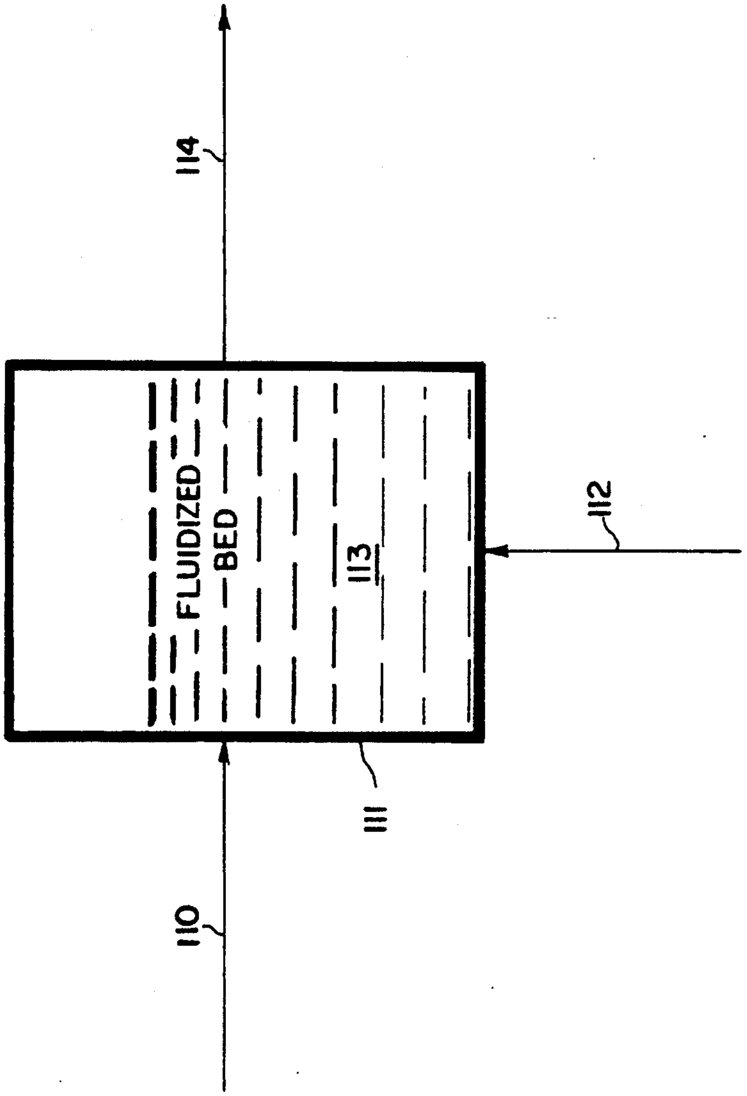
FIG. 2 is a flow diagram of a second embodiment of the present invention.

A second embodiment of the present invention is to heat ambient air as the oxygen-containing gas to a temperature from about 375° C. to about 800° C. followed by contacting the mixture of fly ash and the calcium-containing material with the heated air for a period of time from about 170 seconds to about five hours wherein said contacting is performed while the mixture is contained within a fluidized bed. FIG. 2 illustrates this embodiment. Referring now to FIG. 2, a first feed stream 110 comprising the mixture of the fly ash and the calcium-containing material is introduced into the fluidized bed reactor 111. A second feed stream 112 comprising air which has been heated to a temperature from about 375° C. to about 800° C. is also introduced into the fluidized bed reactor 111 in a manner to form a fluidized bed 113 of the fly ash and calcium-containing material within the fluidized bed reactor 111 thereby providing direct and intimate contact between the fly ash and calcium-containing material of stream 110 and the heated air stream 112 for a period of time from about 170 seconds to about five hours. The effluent from the fluidized bed (represented by stream 114 in FIG. 2) will comprise the treated fly ash product and the heated air. The heated air can be separated from the solids in stream 114 by means well known in the art (e.g. cyclone separators) and recycled to the air feed stream 112 to recover its heat content. A portion of the fly ash in the effluent from the fluidized bed reactor 111 may become entrained within the heated air during the contact time between the two feed streams and thus require separation in a particulate separator. After separation, this portion may be recycled to the fly ash feed stream 110 or withdrawn as treated fly ash product, depending whether the contact time for the entrained fly ash was sufficient.

What is claimed is:

1. A process for the stabilization of heavy metals-containing fly ash obtained by subjecting a flue gas containing acid gas components to scrubbing with an aqueous slurry of a calcium-containing compound wherein the calcium-containing compound is present in an amount from about 1.2 to about 4 times the stoichiometric amount required to capture the acid gas components in the flue gas and to particulate separation to recover the fly ash, which process comprises heating the fly ash to a temperature from about 375° C. to about 650° C. and maintaining said temperature for a period of time from about 170 seconds to about five hours while in the presence of an oxygen-containing gas.

2. The process of claim 1 wherein the contacting of the flue gas with the calcium-containing compound is effected by spray dry absorption employing slaked lime.

3. The process of claim 1 wherein the fly ash is heated to a temperature above about 400° C.

4. The process of claim 1 wherein the fly ash is heated to at a temperature from about 450° to about 600° C.

5. The process of claim 1 wherein the period of time is less than about three hours.

6. The process of claim 1 wherein the period of time is from about 200 seconds to about one hour.

7. The process of claim 1 wherein the period of time is from about five minutes to about thirty minutes.

8. The process of claim 1 wherein the oxygen-containing gas is flowed over the fly ash being treated.

9. The process of claim 8 wherein the period of time is from about three minutes to about thirty minutes and the temperature is from about 375° C. to about 550° C.

10. The process of claim 1 wherein said flue gas is obtained by combusting carbon-, heavy metal-, and halogen-containing materials in a furnace having a combustion zone and a heat recovery zone, a portion of which heat recovery zone is at a temperature from about 375° C. to about 650° C.

11. The process of claim 10 wherein the portion of the process comprising heating the fly ash to a temperature from about 375° C. to about 650° C. and maintaining said temperature for a period of time from about 170 seconds to about five hours while in the presence of an oxygen-containing gas comprises:

(a) adding the oxygen-containing gas to the fly ash to form a subsequent mixture;

(b) placing the subsequent mixture in the portion of the furnace's heat recovery zone which is at a temperature from about 375° C. to about 650° C. for a period of time from about 170 seconds to about five hours;

(c) removing the subsequent mixture from the furnace.

12. The process of claim 11 wherein ambient air is used as the oxygen-containing gas.

13. The process of claim 12 wherein steps (b) and (c) are performed while the subsequent mixture is contained within an enclosed material transfer device.

14. The process of claim 1 wherein the portion of the process comprising heating the fly ash to a temperature from about 375° C. to about 650° C. and maintaining said temperature for a period of time from about 170 seconds to about five hours while in the presence of an oxygen-containing gas comprises:

(a) heating the oxygen-containing gas to a temperature from about 375° C. to about 650° C.;

(b) contacting the mixture with the heated oxygen-containing gas from step (a) for a period of time from about 170 seconds to about five hours.

15. The process of claim 14 wherein ambient air is used as the oxygen-containing gas.

16. The process of claim 15 wherein step (b) is performed while the mixture is contained within a fluidized bed.

* * * * *